United States Patent [19]

Matsunaga

[11] Patent Number: 5,267,041
[45] Date of Patent: Nov. 30, 1993

[54] GHOST CANCELLING CIRCUIT

[75] Inventor: Mitsuhiro Matsunaga, Tokyo, Japan

[73] Assignee: NEC Corporation, Tokyo, Japan

[21] Appl. No.: 731,450

[22] Filed: Jul. 17, 1991

[30] Foreign Application Priority Data

Jul. 17, 1990 [JP] Japan .............................. 2-188549

[51] Int. Cl.⁵ .............................. H04N 5/21
[52] U.S. Cl. .................... 358/167; 358/905
[58] Field of Search ............... 358/167, 36, 905, 166

[56] References Cited

U.S. PATENT DOCUMENTS

| | | | |
|---|---|---|---|
| 4,502,077 | 2/1985 | Morotomi | 358/905 |
| 4,897,317 | 1/1990 | Tanaka | 358/167 |
| 5,025,317 | 6/1991 | Koguchi | 358/167 |

*Primary Examiner*—Tommy P. Chin
*Attorney, Agent, or Firm*—Whitham & Marhoefer

[57] ABSTRACT

A ghost cancelling circuit is provided with a gain limiting block for limiting recursive coefficients for a ghost cancelling filter to a level less than 0 dB in a frequency domain, so that the gains of the recursive coefficients are limited both in the frequency domain and in the time domain. Accordingly, the ghost cancelling filter will never oscillate.

5 Claims, 8 Drawing Sheets

GHOST CANCELLING CIRCUIT

BACKGROUND OF THE INVENTION

1. Field of the Invention

The present invention relates to a circuit for cancelling a group delay distortion, a frequency characteristic distortion, ghost and others generated in the course of a propagation of a television signal.

2. Description of Related Art

A typical one of conventional ghost cancelling circuits includes an analog/digital converter for receiving a television signal (in general cases, a composite video signal), and a waveform equalizing filter receiving a digitized television signal from the analog/digital converter for equalizing the waveform of the television signal in a frequency characteristics. A ghost cancelling filter block is connected to an output of the equalizing filter, and a digital/analog converter is connected to receive an output of the ghost cancelling filter block, so as to output a compensated analog television signal.

The ghost cancelling filter block mainly comprises an adder having a first input connected to the output of the waveform equalizing filter and a second input connected to receive an artificial ghost signal generated by a transversal filter. An output of the adder is connected to an input of the digital/analog converter. The output of the adder is also connected to an input of an variable delay circuit, whose output is in turn connected to the transversal filter, for the purpose of making a position of the artificial ghost signal generated by the transversal filter consistent with a position of a ghost signal superimposed on the television signal. Thus, as mentioned above, since the artificial ghost signal generated by the transversal filter is added to the television signal including the ghost signal by means of the adder, if the artificial ghost signal generated by the transversal filter has a characteristics in opposition to that of the ghost signal included in the television signal, the ghost signal included in the television signal is cancelled by the artificial ghost signal generated by the transversal filter. Therefore, the television signal having no ghost signal is outputted from the ghost cancelling filter block.

The transversal filter basically includes a number of cascaded delay circuits, a first one of the cascaded delay circuits being connected to receive an input signal, namely, the output of the variable delay circuit. Outputs (called "tap outputs") of all the cascaded delay circuits are in parallel connected to a corresponding number of multipliers, respectively, each of which operates to multiply a received signal by a corresponding so-called tap gain. Outputs of all the multipliers are combined by a summing circuit, so that the artificial ghost signal is generated from the summing circuit.

The above mentioned tap gains of the number corresponding to the number of the multipliers are given by a filter control block, which includes a reference signal detection circuit having an input connected to the output of the analog/digital converter and operating to detect a ghost cancellation reference signal from the television signal. The ghost cancellation reference signal detected and outputted by the reference signal detection circuit is supplied to a Fourier transform block, so that the ghost cancellation reference signal is orthogonally transformed into a frequency domain. The Fourier-transformed ghost cancellation reference signal thus obtained is supplied to a filter coefficient generation block, which also receives a reference waveform outputted from a reference waveform memory. On the basis of a difference between the Fourier-transformed ghost cancellation reference signal and the reference waveform, the filter coefficient generation block generates a filter coefficient for controlling the waveform equalizing filter and recursive coefficients for cancelling the ghost signal.

The filter coefficient and the recursive coefficients thus generated are supplied to an inverse Fourier transform circuit, in which those coefficients are transformed into a time domain. The recursive coefficients outputted from the inverse Fourier transform circuit, which are to be distributed to the tap gain inputs of the transversal filter, are supplied through a gain limiter to a gain controller. The gain limiter operates to restrict tap gains which are not less than 0 dB, to possible maximum values in the range of less than 0 dB. The gain controller receives the tap gains which have been limited below 0 dB, and operates to set the tap gain inputs of the transversal filter to the corresponding received tap gains, respectively. In addition, the gain controller also operates to set the waveform equalizing filter with the filter coefficient outputted from the inverse Fourier transform circuit, and to control a delay time of the variable delay circuit.

Thus, the television signal outputted from the ghost cancellation filter block as a result of the tap setting has a suppressed ghost signal component, and is converted or returned into an analog television signal by the analog/digital converter.

As mentioned above, the conventional ghost cancelling circuit has been such that the limitation of the tap gains outputted from the inverse Fourier transform circuit is only one tap gain limitation. In other words, the tap gains are limited only in a time domain. As a result, the conventional ghost cancelling filter has often oscillated, so that the television signal having passed through the ghost cancelling filter is destroyed. In order to overcome this problem, it is considered to further limit the tap gains outputted from the inverse Fourier transform circuit. However, since the gain limitation in the time domain will limit the gain over a full range of a frequency band, a large gain limitation in the time domain will bring about the result that the ghost signal included in the television signal cannot be completely cancelled.

SUMMARY OF THE INVENTION

Accordingly, it is an object of the present invention to provide a ghost cancelling circuit which has overcome the above mentioned defect of the conventional one.

Another object of the present invention is to provide a ghost cancelling circuit capable of completely cancelling a ghost signal included in a television signal without causing a ghost cancelling filter to oscillate.

The above and other objects of the present invention are achieved in accordance with the present invention by a ghost cancelling circuit characterized in that there is provided a limiter means for limiting recursive coefficients for a ghost cancelling filter to a level less than 0 dB in a frequency domain. Preferably, the limiter means has a plurality of different level-limiting input/output characteristics according to which any input signal is limited to a level less than 0 dB. The limiter means operates to select one of the plurality of level-limiting input/output characteristics in accordance with a level of each input signal so that the input signal is limited to a level less than 0 dB in accordance with a selected level-limiting input/output characteristics.

The above and other objects, features and advantages of the present invention will be apparent from the following description of preferred embodiments of the invention with reference to the accompanying drawings.

BRIEF DESCRIPTION OF THE DRAWINGS

FIGS. 6 and 6A illustrate gain/frequency characteristics realized by the gain limiting block incorporated in the ghost cancelling circuit shown in FIG. 3;

DESCRIPTION OF THE PREFERRED EMBODIMENTS

Figure 1:
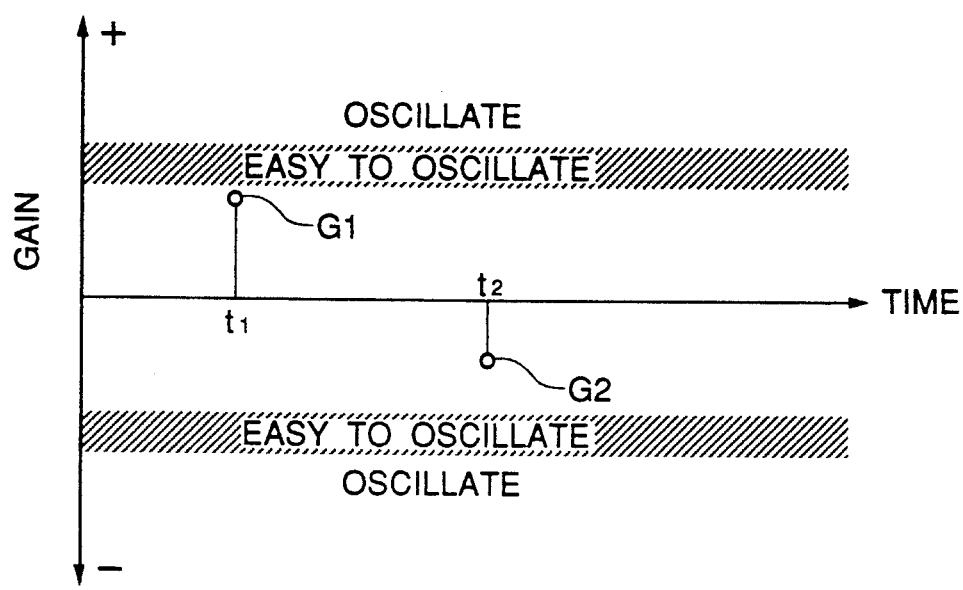
FIG. 1 illustrates two examples of the tap gain in the time domain obtained in a conventional ghost cancelling circuit.

Referring to FIG. 1, two examples of the tap gain in the time domain obtained in the conventional ghost cancelling circuit as mentioned hereinbefore are illustrated. Here, Reference Sign G1 indicates a tap gain on a time $t_1$ in the time domain, and Reference Sign G2 indicates a tap gain on a time $t_2$ in the time domain, where $t_1 < t_2$. In addition, assume that each of the tap gains G1 and G2 are limited less than 0 dB.

Figure 2:
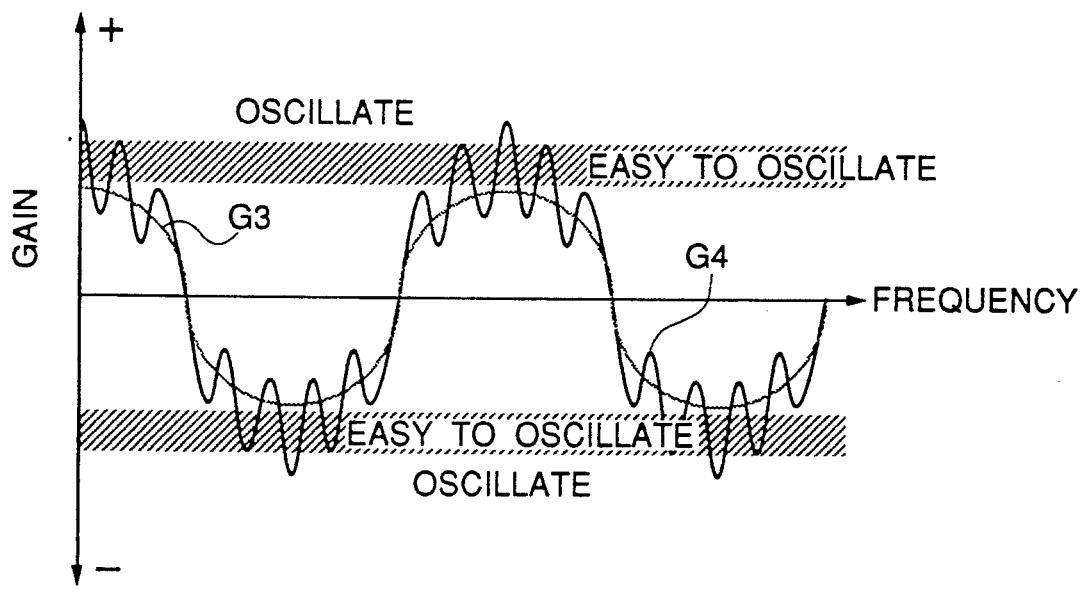
FIG. 2 illustrates the tap gains in the frequency domain obtained by orthogonally transforming the two tap gains in the time domain shown in FIG. 1.

Turning to FIG. 2, there are illustrated the tap gains obtained by orthogonally transforming the two tap gains G1 and G2 in the time domain shown in FIG. 1 onto a frequency domain. A dotted line G3 shows a tap gain by orthogonally transforming the tap gain G1, and a solid line G4 indicate a tap gain obtained by combining the tap gain G3 with a tap gain obtained by the orthogonal transform of the tap gain G2.

The tap gain G4 can be expressed by the following equation:

$$|\text{gain } G4| \times \exp(-j\omega) = |\text{gain } G1| \times \exp(-j\omega) + |\text{gain } G2| \times \exp(-j\omega)$$

Therefore, if the gains are limited to only the effect of $|\text{gain } G1| < 0$ dB and $|\text{gain } G2| < 0$ dB, there exists possibility of $|\text{gain } G4| \geq 0$ dB.

Figure 3:
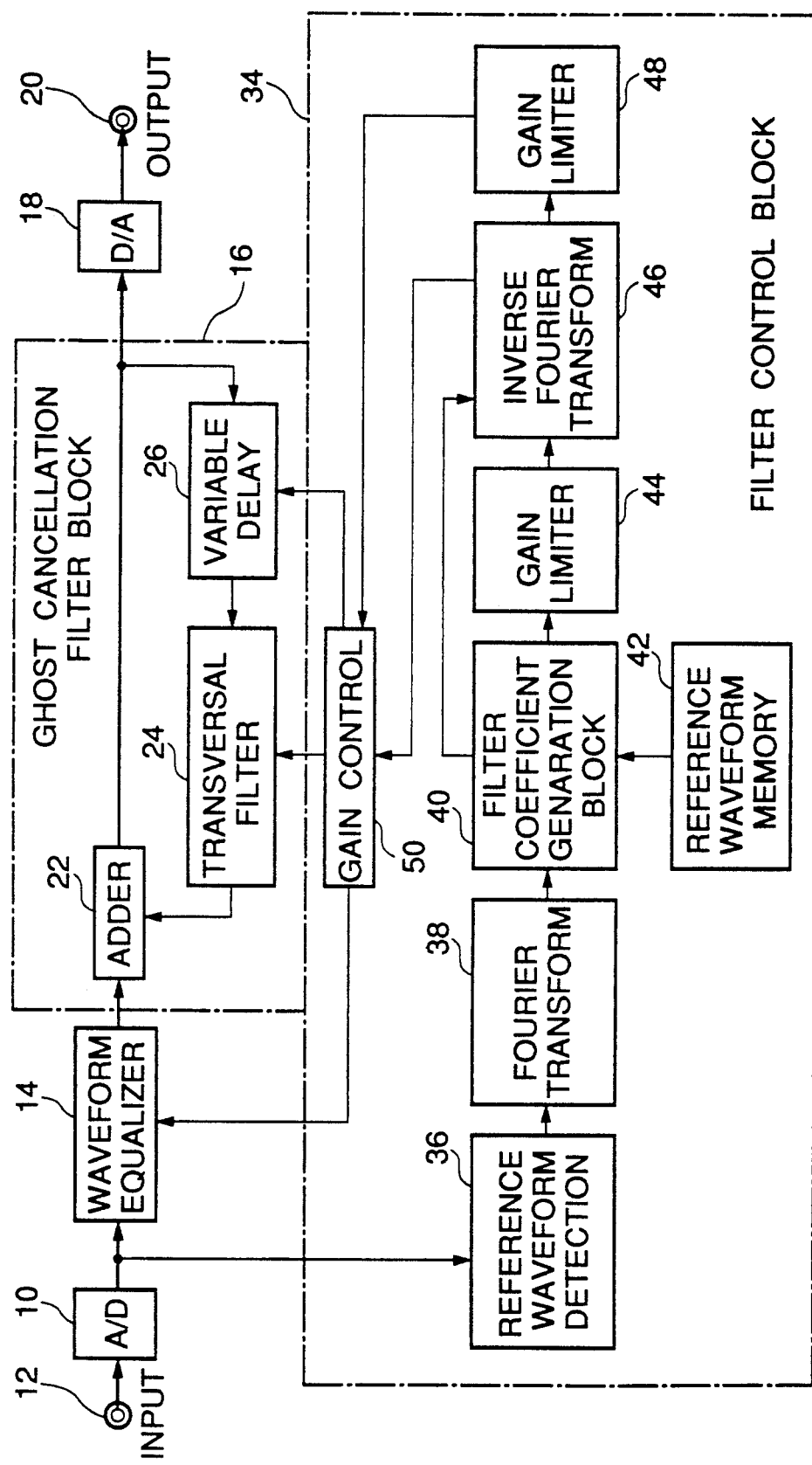
FIG. 3 is a block diagram of a first embodiment of the ghost cancelling circuit in accordance with the present invention.

Referring to FIG. 3, there is shown a block diagram of a first embodiment of the ghost cancelling circuit in accordance with the present invention.

The shown ghost cancelling circuit includes an A/D (analog/digital) converter 10 for receiving a television signal (in general cases, a composite video signal) through an input node 12. A digitized television signal outputted from the A/D converter 10 is supplied to a waveform equalizing filter 14 for equalizing the waveform of the television signal in a frequency characteristics. An output of the equalizing filter 14 is connected to an input of a ghost cancelling filter block 16, and an output of the ghost cancelling filter block 16 is connected to a D/A (digital/analog) converter 18 for outputting a compensated analog television signal to an output terminal 20.

The ghost cancelling filter block 16 comprises an adder 22 having a first input connected to the output of the waveform equalizing filter 14 and a second input connected to receive an artificial ghost signal generated by a transversal filter 24. An output of the adder 22 is connected to an input of the digital/analog converter 18. The output of the adder 22 is also connected to an input of an variable delay circuit 26, which in turn has an output connected to the transversal filter 24, for the purpose of making a position of the artificial ghost signal generated by the transversal filter 24 consistent with a position of a ghost signal superimposed on the television signal. Thus, since the artificial ghost signal generated by the transversal filter 24 is added to the television signal including the ghost signal by action of the adder 22, if the artificial ghost signal generated by the transversal filter 24 has a characteristics in opposition to that of the ghost signal included in the television signal, the ghost signal included in the television signal is cancelled by the artificial ghost signal generated by the transversal filter 24, so that the television signal having no ghost signal is outputted from the ghost cancelling filter block 16 to the D/A converter 18.

Figure 4:
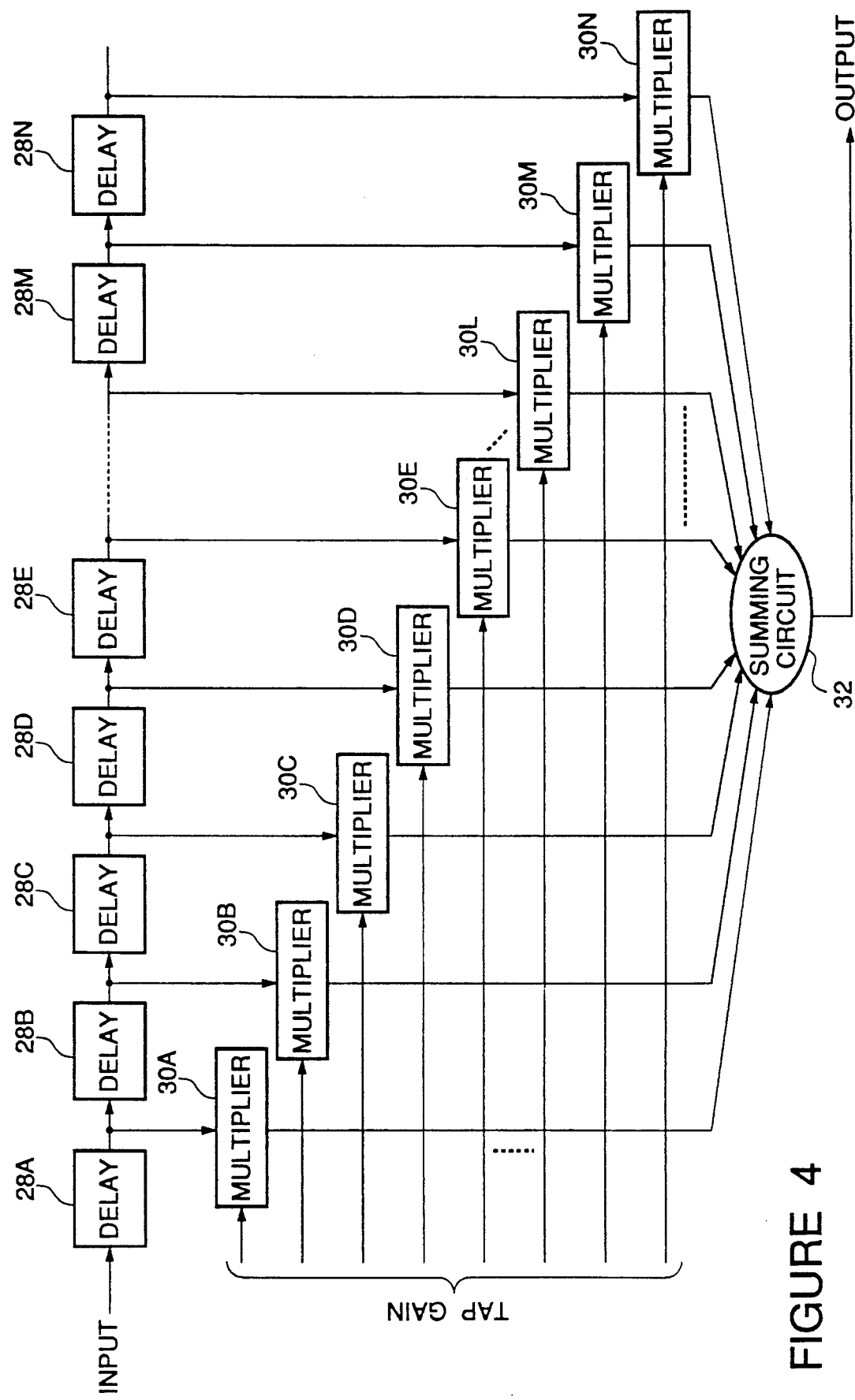
FIG. 4 is a block diagram of a typical example of the transversal filter incorporated in the ghost cancelling circuit shown in FIG. 3.

As shown in FIG. 4, the transversal filter includes a number of cascaded delay circuits 28A, 28B, 28C, ... 28M and 28N, each of which operates to delay a received signal by only one clock. This clock is a signal having a frequency which is n times the frequency of a sub-carrier signal of the television signal, and which is in synchronism with a burst signal of the television signal. A first one 28A of the cascaded delay circuits is connected to receive a digitized television signal, namely, the output of the variable delay circuit 26.

Outputs of all the cascaded delay circuits 28A, 28B, 28C, ... 28M and 28N are called "tap outputs", and are in parallel connected to a corresponding number of multipliers 30A, 30B, 30C, ... 30M and 30N, respectively. Each of the multipliers 30A, 30B, 30C, ... 30M and 30N receives a corresponding so-called tap gain, and operates to multiply a signal received from a corresponding delay circuit by the received corresponding tap gain. Outputs of all the multipliers 30A, 30B, 30C, ... 30M and 30N are supplied to a summing circuit 32, so that the artificial ghost signal is generated from the summing circuit 32.

Returning to FIG. 3, the above mentioned tap gains of the number corresponding to the number of the multipliers 30A, 30B, 30C, ... 30M and 30N are given by a filter control block 34. This filter control block 34 includes a reference signal detection circuit 36 having an input connected to the output of the A/D converter 10 and operating to detect a ghost cancellation reference signal from the television signal. The ghost cancellation reference signal detected and outputted by the reference signal detection circuit 36 is supplied to a Fourier transform block 38, so that the ghost cancellation reference signal is orthogonally transformed into a frequency domain. The Fourier-transformed ghost cancellation reference signal thus obtained is supplied to a filter coefficient generation block 40, which also receives a reference waveform outputted from a reference waveform memory 42. On the basis of a difference between the Fourier-transformed ghost cancellation reference signal and the reference waveform, the filter coefficient generation block 40 generates a filter coefficient for controlling the waveform equalizing filter 14 and recursive coefficients for cancelling the ghost signal.

The recursive coefficients thus generated are supplied to a gain limiting block 44 and gain-limited to a level less than 0 dB by the gain limiting block 44. The recursive coefficients thus gain-limited in a frequency domain is supplied to an inverse Fourier transform circuit 46, in which the recursive coefficients are transformed into a time domain. On the other hand, the filter coefficient generated by the filter coefficient generation block 40 is supplied to the inverse Fourier transform circuit 46 without being subjected to the gain limitation, so that the filter coefficient is transformed into the time domain.

The recursive coefficients outputted from the inverse Fourier transform circuit 46 are supplied through a gain limiter 48 to a gain controller 50. The gain limiter 48 operates to restrict tap gains (in the time domain) which are not less than 0 dB, to a possible maximum value in the range of less than 0 dB. The gain controller 50 receives the tap gains (which have been limited below 0 dB) supplied from the gain limiter 48, and operates to set the tap gain inputs of the transversal filter 24 with the corresponding received tap gains, respectively. In addition, the gain controller 50 also operates to set the waveform equalizing filter 14 with the filter coefficient outputted from the inverse Fourier transform circuit 46, and to control a delay time of the variable delay circuit 26.

Figure 5:
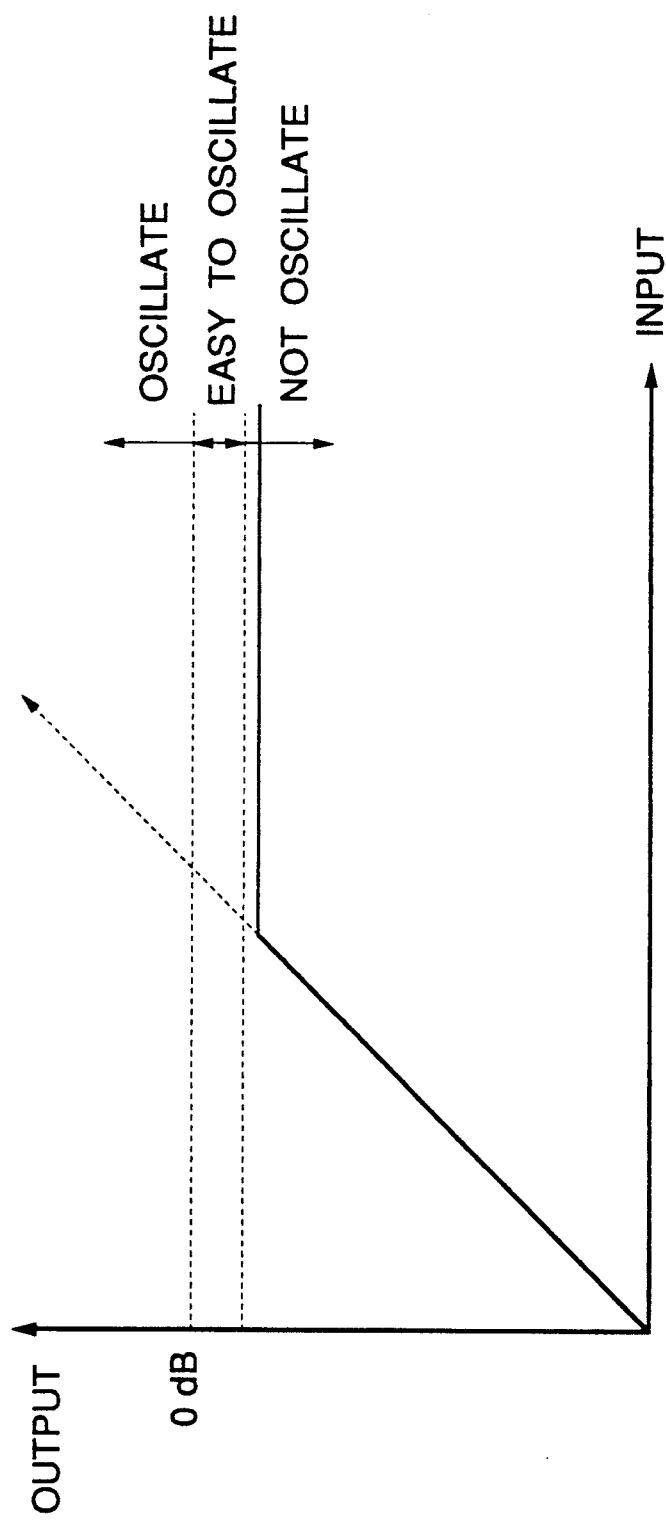
FIG. 5 illustrates an input/output characteristics of the gain limiting block incorporated in the ghost cancelling circuit shown in FIG. 3.

Referring to FIG. 5, there is illustrated an input/output characteristics of the gain limiting block 44. As seen from FIG. 5, the gain limiting block 44 operates to limit the recursive coefficients on the frequency domain to a maximum level which is lower than an easy-to-oscillate region. If a gain is higher than 0 dB, oscillation occurs. However, even if the gain is less than 0 dB, if the gain is near to 0 dB, it is easy to oscillate. Therefore, it is preferred to limit the gain less than a gain region in which it is easy to oscillate.

Figure 6:
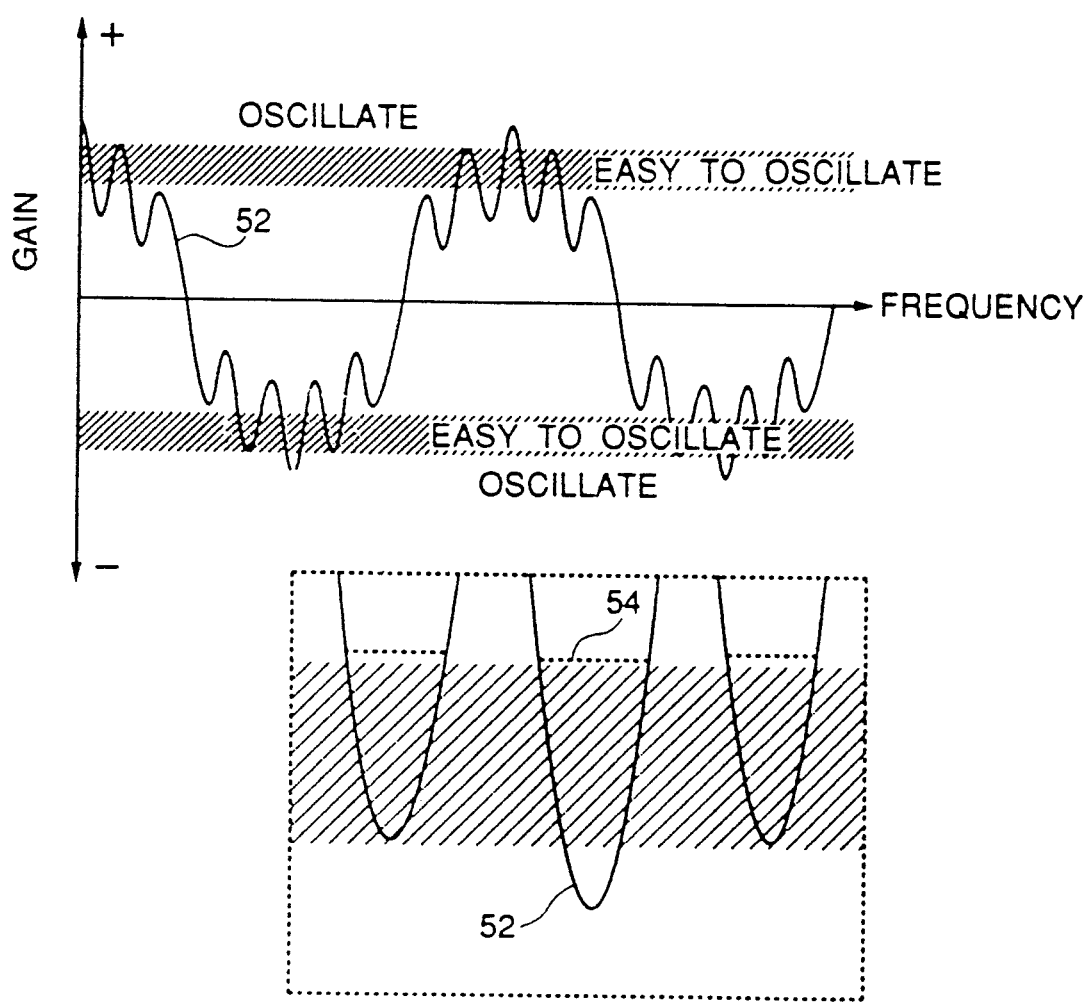

Turning to FIG. 6, there is illustrated an effect of the gain limiting block 44. A solid line 52 shows a recursive coefficient given to the ghost cancelling filter block 16 when the gain limiter 48 is provided but the gain limiting block 44 is not provided. The recursive coefficient 52 occasionally exceeds the easy-to-oscillate level. On the other hand, a dotted line 54 indicates a recursive coefficient given to the ghost cancelling filter block 16 when not only the gain limiter 48 but also the gain limiting block 44 are provided. The recursive coefficient 54 having passed through the gain limiting block 44 and the gain limiter 48 does not exceed 0 dB not only in the time domain but also in the frequency domain. Therefore, the ghost cancelling filter block 16 will never oscillate, and accordingly, the television signal in which the ghost component has been cancelled will not be destroyed.

Furthermore, since the recursive coefficients for the ghost cancelling filter block are gain-limited in the frequency domain before the gain-limitation in the time domain, the amount of the gain-limitation in the time domain is made small. On the other hand, the gain-limitation in the frequency domain is made only in limited frequencies. Therefore, the ghost signal remaining uncanceled in the television signal can be made to a slight degree, in comparison with the conventional ghost cancelling circuit in which the tap gains are limited only in the time domain.

Figure 7:
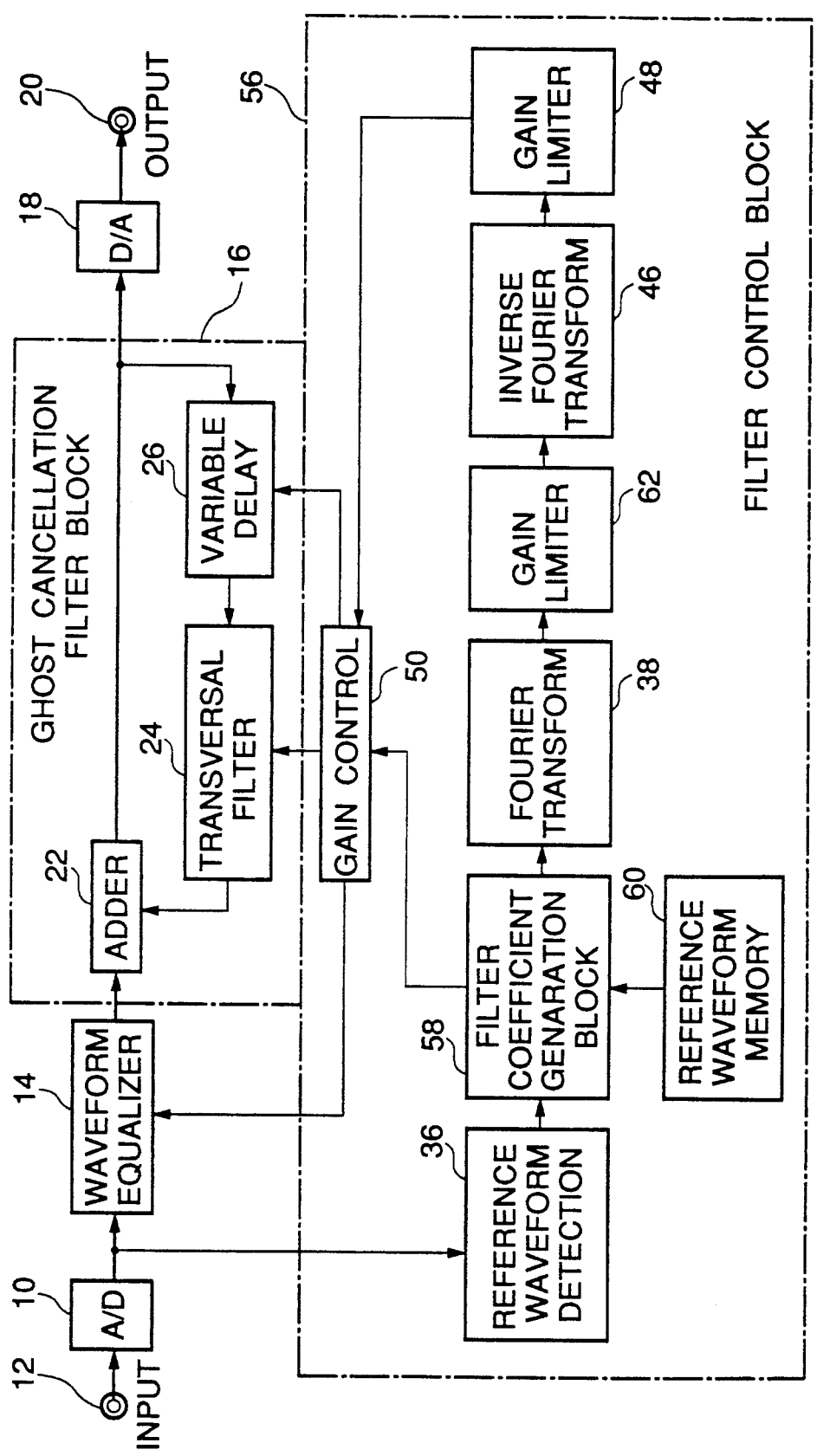
FIG. 7 is a block diagram of a second embodiment of the ghost cancelling circuit in accordance with the present invention.

Referring to FIG. 7, there is shown a block diagram of a second embodiment of the ghost cancelling circuit in accordance with the present invention. In FIG. 7, elements corresponding to those shown in FIG. 3 are given the same Reference Numerals, and explanation thereof will be omitted.

The second embodiment includes a filter control block 56 different from the filter control block 34. The filter control block 56 includes a filter coefficient generation block 58, a reference waveform memory 60 and a gain limiting block 62, which are different from corresponding ones of the filter control block 34 in the first embodiment.

The reference waveform memory 60 stores a reference waveform in the time domain, and the filter coefficient generation block 58 compares, in the time domain, the ghost cancellation reference signal detected and outputted from the reference waveform detection circuit 36, with a reference waveform supplied from the reference waveform memory 60, in order to obtain the amount of propagation distortion of the ghost cancellation reference signal, and to generate a filter coefficient for the waveform equalizing filter 14 and recursive coefficients for the ghost cancelling filter block 16.

The filter coefficient for the waveform equalizing filter 14 is generated in the time domain, and therefore, is supplied, without modification and without transform, to the gain control circuit 50. On the other hand, the recursive coefficients are supplied to the Fourier transform circuit 38 so that the recursive coefficients are transformed onto the frequency domain. The recursive coefficients in the frequency domain are supplied to the gain limiting block 62, which operates to limit received signals in accordance with a segmented input/output characteristics which will gradually increase the degree of gain limitation toward a critical level at which the ghost cancelling filter block starts to oscillate. The recursive coefficients in the frequency domain gain-limited by the gain limiting block 62 are supplied to the inverse Fourier transform circuit 46, so that the recursive coefficients gain-limited in the frequency domain is transformed onto the time domain.

Figure 8:
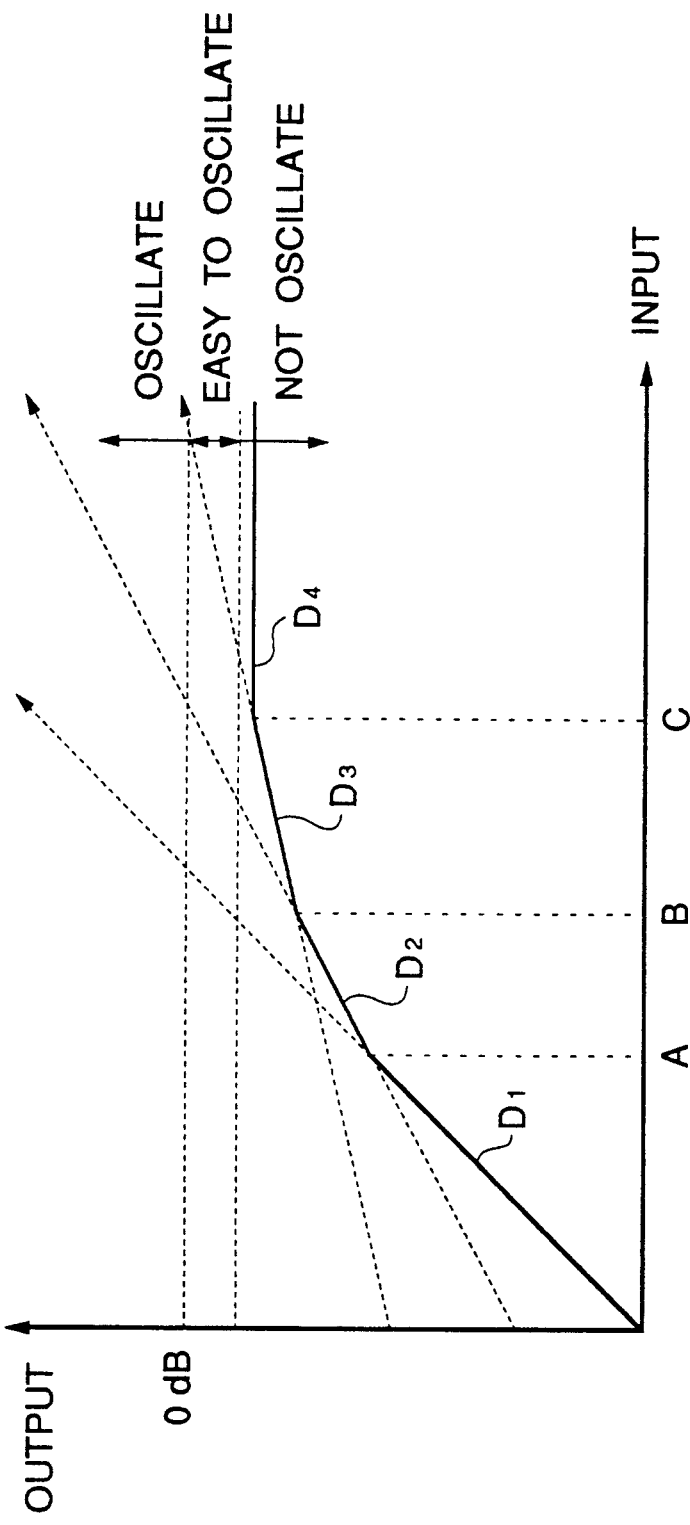
FIG. 8 illustrates an input/output characteristics of the gain limiting block incorporated in the ghost cancelling circuit shown in FIG. 7.

FIG. 8 illustrates an input/output characteristics of the gain limiting block 62. For ensuring that the gain of the recursive coefficients in the frequency domain will not reach or exceed the critical level at which the ghost cancelling filter block becomes easy to oscillate, the gain limiting block 62 has the input/output characteristics having four different inclinations $D_1$, $D_2$, $D_3$ and $D_4$. For example, when an input level is not greater than a level A, the gain limiting block 62 has the input/output characteristics of a first inclination $D_1$. When the input level is greater than the level A but not greater than a level B, the gain limiting block 62 has the input/output characteristics of a second inclination $D_2$ which is smaller than the first inclination $D_1$. When the input level is greater than the level B but not greater than a level C, the gain limiting block 62 has the input/output characteristics of a third inclination $D_3$ which is smaller than the second inclination $D_2$. When the input level is greater than the level C, the gain limiting block 62 has the input/output characteristics of a fourth inclination $D_4$ which causes the gain limiting block 62 to output a constant level slightly smaller than the easy-to-oscillate level, regardless of the level of the input signal.

Figures 9, 9A:
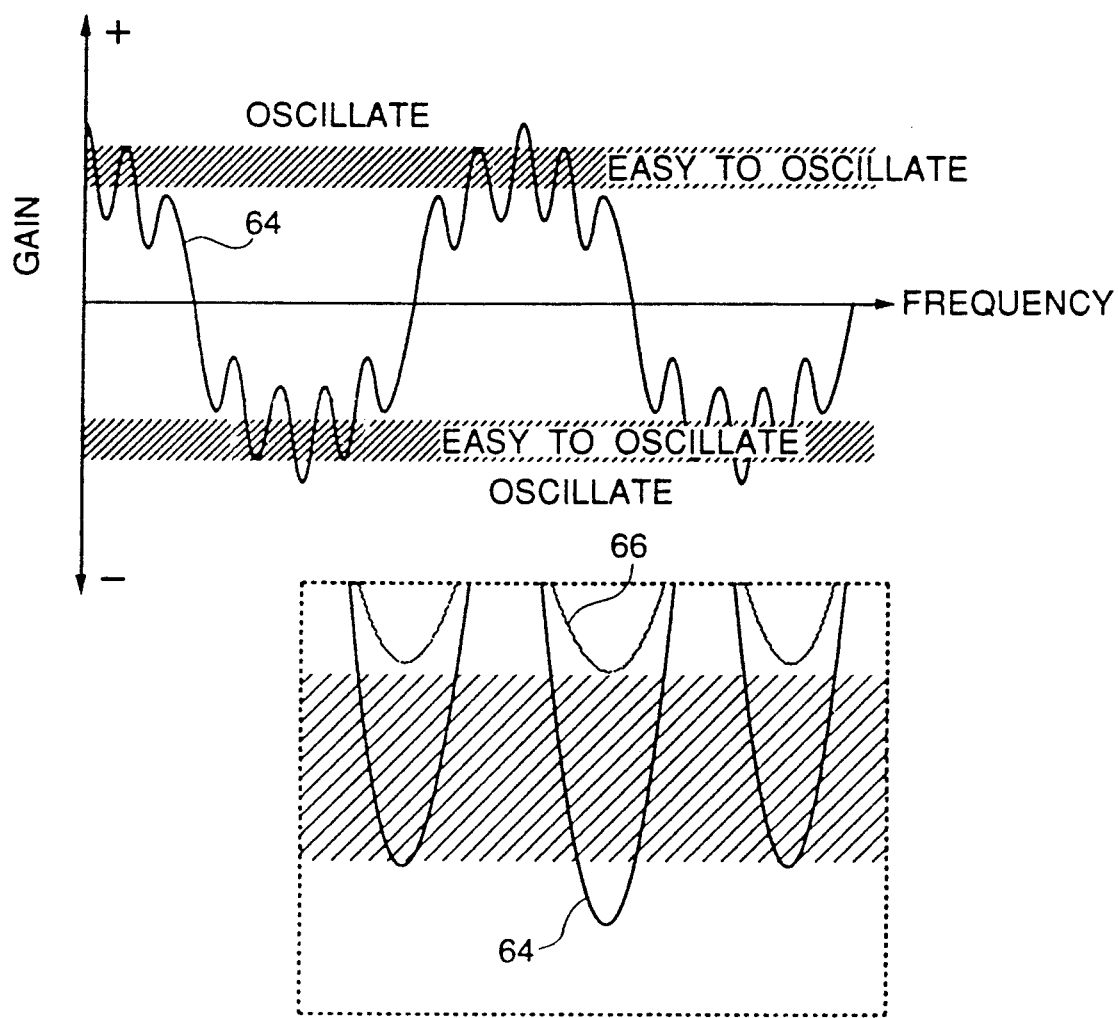
FIGS. 9 and 9A illustrate gain/frequency characteristics realized by the gain limiting block incorporated in the ghost cancelling circuit shown in FIG. 7.

Turning to FIG. 9, there is illustrated an effect of the gain limiting block 62. A solid line 64 shows a recursive coefficient given to the ghost cancelling filter block 16 when the gain limiter 48 is provided but the gain limiting block 62 is not provided. The recursive coefficient 64 occasionally exceeds the easy-to-oscillate level. On the other hand, a dotted line 66 indicates a recursive coefficient given to the ghost cancelling filter block 16 when not only the gain limiter 48 but also the gain limiting block 62 are provided. The recursive coefficient 66 having passed through the gain limiting block 62 and the gain limiter 48 does not exceed 0 dB not only in the time domain but also in the frequency domain. Therefore, the ghost cancelling filter block 16 will never oscillate.

In addition, the second embodiment is such that the gain of the recursive coefficients in the frequency domain is limited in accordance with four continuous segmented input/output characteristics which will gradually increase the degree of gain limitation toward the critical level at which the ghost cancelling filter block starts to oscillate. Therefore, the recursive coefficients transformed onto the time domain can have a reduced number of discontinuous points, in comparison with the first embodiment. If this gain limiting blocks 62 is incorporated into the first embodiment, a similar effect can be obtained.

As seen from the above description of the embodiments with reference to the accompanying drawings, the ghost cancelling circuit in accordance with the present invention is configured to limit the gains of the recursive coefficients both in the frequency domain and in the time domain. Accordingly, the ghost cancelling filter will never oscillate.

As mentioned hereinbefore, if the tap gains are limited only in the time domain, the gain is limited over a full range of frequency band. In the ghost cancelling circuit in accordance with the present invention, the recursive coefficients are gain-limited in the frequency domain before the gain-limitation in the time domain. Therefore, the amount of the gain-limitation in the time domain is made small.

In addition, the gain-limitation in the frequency domain is made only in limited frequencies. Therefore, the ghost signal remaining uncanceled in the television signal can be made to a slight degree, in comparison with the conventional ghost cancelling circuit in which the tap gains are limited only in the time domain.

The invention has thus been shown and described with reference to the specific embodiments. However, it should be noted that the present invention is in no way limited to the details of the illustrated structures but changes and modifications may be made within the scope of the appended claims.

I claim:

1. A ghost cancelling circuit comprising:
    an analog/digital converter for receiving a television signal;
    a waveform equalizer receiving a digitized television signal from the analog/digital converter for equalizing the waveform of the television signal;
    a ghost cancelling filter block including an adder having a first input connected to the output of the waveform equalizer, a variable delay circuit having an input connected to an output of the adder, and a transversal filter having an input connected to an output of variable delay circuit and controlled by a filter control block so as to output to a second input of the adder an artificial ghost signal which will cancel a ghost signal included in the television signal when the artificial ghost signal is added to the television signal including the ghost signal by means of the adder; and
    a digital/analog converter is connected to the output of the adder of the ghost cancelling filter block, so as to output a compensated analog television signal, the filter control block including:
    a reference signal detection circuit having an input connected to the output of the analog/digital converter for detecting a ghost cancellation reference signal from the television signal;
    a filter coefficient generation means having a Fourier transform function, the filter coefficient generation means receiving the ghost cancellation reference signal from the reference signal detection circuit for generating recursive coefficients in a frequency domain for cancelling the ghost signal;
    a first gain limiter means receiving the recursive coefficients in the frequency domain for outputting the recursive coefficients gain-limited in the frequency domain;
    an inverse Fourier transform circuit receiving the recursive coefficients gain-limited in the frequency domain for generating the recursive coefficients transformed into a time domain;
    a second limiter means receiving the recursive coefficients transformed into the time domain for outputting the recursive coefficients gain-limited in the time domain; and
    a gain controller receiving the recursive coefficients outputted from the second limiter means for controlling corresponding tap gains of the transversal filter.

2. A ghost cancelling circuit claimed in claim 1 wherein the filter coefficient generation means includes a Fourier transform circuit receiving the ghost cancellation reference signal from the reference signal detection circuit for generating the ghost cancellation reference signal orthogonally transformed into a frequency domain, a reference waveform memory storing a reference waveform, and a filter coefficient generation block receiving the ghost cancellation reference signal orthogonally transformed into the frequency domain and the reference waveform for generating the recursive coefficients for cancelling the ghost signal, on the basis of a difference between the ghost cancellation reference signal output from the Fourier transform circuit and the reference signal.

3. A ghost cancelling circuit claimed in claim 2 wherein the filter coefficient generation block also generates a filter coefficient for controlling the waveform equalizer, which is supplied through the inverse Fourier transform circuit and the gain controller to the waveform equalizer.

4. A ghost cancelling circuit claimed in claim 1 wherein the filter coefficient generation means includes a reference waveform memory storing a reference waveform, a filter coefficient generation block receiving the ghost cancellation reference signal from the reference signal detection circuit and the reference waveform for generating the recursive coefficients in a time domain for cancelling the ghost signal, on the basis of a difference between the ghost cancellation reference signal and the reference waveform, and a Fourier transform circuit receiving the recursive coefficients in the time domain for generating the recursive coefficients orthogonally transformed into a frequency domain.

5. A ghost cancelling circuit claimed in claim 4 wherein the filter coefficient generation block also generates a filter coefficient for controlling the waveform equalizer, which is supplied through the gain controller to the waveform equalizer.

* * * * *